United States Patent Office 3,368,988
Patented Feb. 13, 1968

3,368,988
SOLVENT-SOLUBLE, NON-GELLED INTERPOLYMER COMPRISING RESINOUS HYDROXY-TERMINATED POLYETHYLENICALLY UNSATURATED POLYURETHANE
Kazys Sekmakas, Chicago, Ill., assignor to De Soto, Inc., a corporation of Delaware
No Drawing. Filed Apr. 9, 1963, Ser. No. 271,603
26 Claims. (Cl. 260—21)

The present invention is directed to hydroxy-terminated unsaturated polyurethane resins and to copolymers thereof, especially copolymers or interpolymers including alkylolated acrylamide. The new interpolymers are especially useful in organic solvent solution coating compositions either as the sole film-forming resin or in admixture with other resins, particularly those containing hydroxyl groups such as alkyd resins, aminoplast resins and hydroxy-containing addition copolymers.

In accordance with the present invention, a resinous hydroxy-terminated unsaturated polyurethane is copolymerized with other ethylenically unsaturated materials preferably monomers including the $CH_2=C<$ group to form a solvent-soluble, non-gelled interpolymer. Preferably, the monomers include an unsaturated amide providing amido groups which are alkylolated to furnish alkylol groups which are reactive with the hydroxyl groups of the polyurethane providing a heat-hardening cure. The invention is especially directed to organic solvent solution coating compositions in which the polyurethane component provides great flexibility and adhesion and the combination of amido alkylol groups and polyurethane hydroxyl groups provides rapid heat-cure to organic solvent insolubility.

In one aspect of the present invention, an unsaturated polyhydric alcohol is reacted with a molar excess of organic polyisocyanate to form an unsaturated isocyanate-terminated intermediate which is then reacted with additional polyhydric alcohol to increase molecular weight and provide a resinous unsaturated polyisocyanate having hydroxyl termination.

In another aspect of the present invention, a plurality of polyhydric components, including an unsaturated hydroxy component, are reacted with organic polyisocyanate, the hydroxy components being in at least 5% stoichiometric excess, to form a resinous unsaturated polyisocyanate having hydroxyl termination.

Numrous other aspects of the invention will become apparent from the description which follows.

As previously indicated, resinous hydroxy-termined ethylenically unsaturated polyurethane is copolymerized with other ethylenically unsaturated materials, preferably including the $CH_2=C<$ group to form a solvent-soluble, non-gelled interpolymer, an acrylamine or other unsaturated amide being the most important monomer component of the interpolymer. When the interpolymer or one of the monomer components thereof includes amido hydrogen atoms, there are at least partially replaced by reaction with an aldehyde and the hydroxy groups generated in this manner may be etherified in whole or in part, but preferably in minor amount or not at all. Any aliphatic alcohol, including polyhydric alcohols such as glycols, may be used for etherification.

As a result, the interpolymer desirably includes amido hydrogen atoms replaced by the structure:

$$-\overset{R}{\underset{|}{C}}HOR_1$$

wherein R is selected from the group consisting of hydrogen, furyl, and aromatic and saturated lower aliphatic hydrocarbon radicals containing up to 10 carbon atoms, and $R_1$ is selected from the group consisting of hydrogen, and the etherification residue of aliphatic alcohol containing up to 10 carbon atoms. Preferably, R is hydrogen.

As will be more fully appreciated hereinafter, considerable variation is permissible in the kind and ratio of the aldehyde modifying agent and the etherifying agent, if used. Moreover, there is also a considerable variation which can be made in the specific nature of the unsaturated polyurethane component of the interpolymer as well as in the nature and proportion of other copolymerizable monomers which are desirably present.

While it is preferred to employ acrylamide in proportions of from 2 to 50%, preferably from 2 to 30% by weight, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

The acrylamide component and the unsaturated polyurethane component may constitute the entirety of the interpolymer. Nevertheless, it is permissible, and in some instances desirable, to include significant proportions of monomer containing the $CH_2=C<$ group, especially combinations of monomers forming hard polymers, such as styrene, vinyl toluene and methyl methacrylate, with monomers forming soft polymers, such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate. Other diverse monomers such as vinyl chloride, vinyl stearate, n-butyl vinyl ether, lower olefins, acrylonitrile, etc., are also useful. Even materials devoid of the vinyl group such as maleic diesters, butene-2, conjugated fatty acids, etc., may be employed including unsaturated polyester resins, as disclosed in my copending application Ser. No. 115,330, now U.S. Patent No. 3,163,615, issued Dec. 29, 1964.

The unsaturated polyurethane resin which is used in the invention is a resinous, hydroxy-terminated, polyethylenically unsaturated material. As indicated previously, hydroxy-functional material is used in a stoichiometer excess substantially eliminating isocyanate reactivity from the product. Moreover, any residual isocyanate reactivity may be destroyed by reaction with alcohol solvent used in the solution interpolymerization. From 5–98%, preferably from 5–80% by weight of the interpolymer is polyurethane resin in accordance with the invention.

Various organic polyisocyanates may be used in the present invention, without limitation. So many organic polyisocyanates are known as a class to be useful for polyurethane production and all are useful herein so that no effort will be made to list these known materials. Instead, it is simply stated that organic diisocyanates are preferred and the invention will be illustrated using the commercial toluene diisocyanate (mixed isomers) which is well known to the typical of the entire class of useful materials.

Unsaturation may be introduced by the presence of any ethylenically unsaturated monomer including one or more functional groups reactive with the isocyanate group. However, it is preferred to employ ethylenically unsaturated monomers having one or more hydroxy groups as the sole functional group present. These are illustrated by trimethylol propane diallyl ether, glycerol monoallyl ether, 2-hydroxy methyl-5-norbornene, allyl alcohol, crotyl alcohol, glycerol monoacrylate, etc. Monoethylenically unsaturated polyhydric compounds are particularly preferred, and the invention will be illustrated using trimethylol propane monoallyl ether which, in present knowledge, is particularly preferred.

Preferred polyurethanes useful in the invention include a proportion of aliphatic saturated diol and a proportion of aliphatic saturated polyhydric alcohol containing at least 3 hydroxy groups. Either or both of these categories are desirably filled by a polyether.

Diols which may be used include ethylene glycol, propylene glycol and butylene glycol, but higher molecular weight ether glycols are preferred such as polyethylene glycol, polypropylene glycol and polybutylene glycol. Broadly, polyethers having a molecular weight of from 300 to about 7000 may be used, the invention being well illustrated by a commercial polypropylene glycol having an average molecular weight of 1025.

Polyhydric alcohols which may be used are illustrated by glycerin, pentaerythritol, trimethylol propane, hexanetriol, and the like. Polyethers of polyhydric alcohols are also useful such as ethylene oxide, propylene oxide, butylene oxide and styrene oxide polyethers of the polyhydric alcohols noted above as well as of inorganic hydroxy compounds such as phosphoric acid.

Preferably, at least 10%, and more preferably, at least 20% of the total weight of the hydroxy component of the polyurethane is a polyether. Particularly preferred polyethers for use in the invention are propylene oxide addition products with hydroxy compounds containing two or more hydroxy groups and having a molecular weight of from 400 to 5000.

A feature of the invention is the achievement of considerable flexibility and impact resistance in cured coatings in the absence of any oil component as a result of the polyurethane linkage, especially in combination with the presence of polyethers in the polyurethane. For best results, it is desirable to produce a polyurethane in which the unsaturated groups are uniformly distributed and in which polyhydric alcohol containing at least 3 hydroxy groups is used to build chain length to a maximum in the absence of gelation, both during polyurethane production and during polymerization. For this purpose, a two-stage reaction is employed in which the polyhydric monounsaturated component, preferably in admixture with a saturated polyether glycol, is reacted with a large stoichiometric excess of organic polyisocyanate such as about 2 mols of polyisocyanate per mol of polyhydric component, preferably diisocyanate, to form an isocyanate-terminated intermediate which is then reacted with a polyhydric alcohol containing at least 3 hydroxyl groups to form a higher molecular weight polyurethane with many hydroxyl groups available for subsequent cure.

It is also desirable in some instances to obtain additional internal plasticization through the presence of fatty acid groups from drying, semi-drying or non-drying oils. In such instance, the objective is to relatively uniformly distribute the fatty acid groups within the polyurethane resin and to achieve this by a simple procedure using the less expensive oil, e.g., the triglyceride, as opposed to the more expensive fatty acid itself. This objective is achieved by a procedure in which the oil is mixed with the diol and polyhydric alcohol components, and the mixture subjected to alcoholysis to distribute the fatty acid groups to all of the components by transesterification. The complex mixture of partial esters so-produced is then reacted with the polyisocyanate component, preferably diisocyanate, in at least 5% stoichiometric deficiency of isocyanate group, to produce a resinous polyurethane. Molecular weight is controlled by stoichiometry, as is well known, the stoichiometric balance of hydroxy groups to isocyanate group being within the range of from 1.05:1 to 2.5:1, preferably within the range of from 1.1:1 to 2.0:1. Since the unsaturated polyhydric component is also present during a portion of the alcoholysis, or preferably is added shortly prior to polyurethane formation, the unsaturated groups are also well distributed within the polyurethane product.

An important aspect of this reaction is the fact that it occurs at temperatures lower than are required for polyester production and without the separation of water.

The transesterification or alcoholysis reaction is a well-known reaction which takes place at elevated temperature, desirably in the presence of an alcoholysis catalyst. A temperature of 480° F. illustrates a preferred reaction temperature and, in the presence of calcium naphthenate alcoholysis catalyst, a one hour reaction is fully adequate. Other appropriate alcoholysis catalysts are illustrated by calcium oxide and lead oxide. The reaction with polyisocyanate is conveniently carried out at 260–270° F. until viscosity reaches a constant level.

In general, the higher the amount of diisocyanate used in the coating, the better will be the overall properties, particularly with respect to chemical resistance, toughness, curing, and weather resistance. However, there are practical limitations on the amount of diisocyanate. With more than 30 percent by weight of diisocyanate, based on the weight of the polyurethane, the solubility of the coatings diminishes and viscosity increases to very high levels. It is preferred to employ at least 5% by weight, preferably at least 10%, and most preferably at least 20% by weight of diisocyanate on the basis indicated above.

The hydroxyl components of the unsaturated polyurethane resin will significantly influence the properties of the coatings and are selected to produce specific characteristics. At a constant weight of diisocyanate, the functionality of the hydroxyl source affects the viscosity of the coating and the hardness of the film. Increasing the amount of the isocyanate has about the same effect as increased functionality of the hydroxyl component, but has the added advantage of faster cure, better chemical resistance and better weathering properties. When the urethane is formulated with a high percentage of the diisocyanate components, the functionality of the hydroxyl component is preferably reduced to avoid high viscosity and gelation problems. Similarly, when triisocyanates are employed, hydroxyl components having an hydroxyl functionality in excess of 2 are preferably avoided. In essence, one simply regulates the functionality of the various components in known manner to avoid excessive cross-linking which leads, as is also well known, to increased viscosity and a stronger tendency toward premature gelation.

Preferred polyurethane resins possess an unsaturation indicated by an iodine number of from 25 to 400, preferably from 50 to 300. The iodine numbers are measured by the Wijs method which reports the number of grams of iodine absorbed by 100 grams of unsaturated material. Similarly, preferred polyurethane resins possess an hydroxyl functionality indicated by an hydroxyl number of from 10–300 (milligrams of KOH to saponify 1 gram of resin).

While the molecular weight of the polyurethane resin is of secondary significance so long as the polyurethane is not gelled, it is desirable to employ polyurethane resins which have a viscosity in n-butanol at 80% solids in the range of from C to Z–6, preferably in the range of from V to Z–2 measured on the Gardner-Holdt scale at 25° C. Since vinyl monomers other than acrylamide may be excluded and since small amounts of acrylamide are highly effective to provide extensive curing capacity, there are circumstances in which the highest molecular weights may be desirably used, even exceeding the noted viscosities.

With respect to interpolymer production, it is possible, as disclosed in my prior application S.N. 100,804, filed Apr. 5, 1961, now U.S. Patent No. 3,163,623, issued Dec. 29, 1964, the disclosure of which is hereby incorporated by reference, to carry out the addition polymerization reaction at the same time that the aldehyde component is reacted with amido hydrogen atoms. In other words, polymerization and alkylolation may advantageously be accomplished at the same time and in a single stage. A basic catalyst may be used as taught in said prior application. Also, and in the absence of any significant proportion of vinyl monomer other than acrylamide, and especially when the acrylamide component is used in small amount, the single stage polymerization and alkylolation may be carried out without gelation in the absence of a basic catalyst. Also, and as will be evident, the need for extraneous free-radical polymerization catalysts depends upon the extent of polymerization which is to take place.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde, and furfural, or substances yielding an aldehyde, such as paraformaldehyde, hexamethylene tetramine or trioxymethylene can also be used.

Etherification of the aldehyde-modified amide interpolymer is not essential. Lower alcohols containing up to 10 carbon atoms, especially butanol and ethoxy and butoxy ethanol are preferred for etherification and the etherification reaction may be carried out up to 100% of the alkylol radical present in the interpolymer although little or no etherification is preferred. When less than 100% etherification is effected, as is preferred, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a hydrocarbon radical introduced by the aldehyde modifying agent and R$_1$ is the residue of the alcohol produced by the etherification reaction. When the etherifying alcohol is a glycol, the group R$_1$ is hydroxy-terminated, but this is permissible in the invention in which the presence or absence of etherification is a mere matter of choice.

While the interpolymers of the present invention are importantly useful alone in organic solvent solution coating compositions, they also exhibit excellent compatibility with other film-forming resinous materials, and are desirably applied in admixture therewith, the term "admixture" including partial pre-reaction between the respective components which are blended together. In this regard, excellent compatibility is exhibited with heat-hardening, solvent-soluble polymethylol compounds including ureaformaldehyde condensates and melamine-formaldehyde condensates as well as aldehyde condensates with other triazines, such as benzoguanamine, all of the foregoing falling generally within the heading of aminoplast resins. Good compatibility with other film-forming resins extends to alkyl resins, epoxy resins and vinyl resins. Also, the resinous materials may be employed alone, or in combination with one another.

Of especial note in connection with the present invention and as features thereof, excellent compatibility exists with hexamethylol melamine and hydroxy-containing addition copolymers illustrated particularly by copolymers of vinyl chloride and vinyl acetate which have been partially hydrolyzed or saponified to convert a portion of the vinyl acetate groups to hydroxy groups. The hydroxyl group provided in the addition copolymer referred to and in the hexamethylol melamine is highly reactive with the amido alkylol group of the acrylamide interpolymer and also with the hydroxyl groups of the unsaturated polyurethane to provide a rapid cure at elevated temperature producing insoluble coatings characterized by unusual flexibility coupled with significant hardness, properties which are normally antagonistic with respect to one another. Preferred copolymers contain from 80–92% by weight of vinyl chloride, with the balance of the copolymer being essentially vinyl acetate, and with a portion of the vinyl acetate converted to vinyl alcohol to provide a vinyl alcohol content of from 2–10% by weight, preferably from 3–8% by weight.

In the provision of blends in accordance with the invention, the proportions of the resinous materials which are blended may vary over the weight range of from 5:95 to 95:5. Preferably, the acrylamide interpolymer is used in proportions of from 20–90%, based on the weight of the mixture of resinous materials, and most preferably the acrylamide interpolymer is present in a major proportion of from 50–90%, based on the total weight of resinous material, especially when the acrylamide content of the interpolymer is in the range of from 2–20%, based on the weight of the interpolymer.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with the other resinous materials listed hereinbefore, from a compatible organic solvent solution. These coating solutions may be pigmented or contain dyes, flow control agents, waxes and various other components as will be evident to those skilled in the art.

In the examples which follow, all parts are by weight, unless otherwise indicated.

EXAMPLE I

An oil modified unsaturated polyurethane is prepared as follows, using an 11% excess of hydroxyl with respect to isocyanate:

|  | Parts by weight |
|---|---|
| Coconut oil | 1635 |
| Polypropylene glycol polyether (molecular weight 1025) | 175 |
| Glycerine | 235 |
| 4% calcium naphthenate drier | 5 |

Charge the above ingredients to a reactor and heat to 480° F. Hold for 1 hour using nitrogen sparge. Cool to 250° F. and add:

| Trimethylol propane monoallyl ether | 160 |
|---|---|

Cool to 120° F.

Premix in separate container and add over 1 hour period:

| Toluene diisocyanate | 780 |
|---|---|
| Aromatic hydrocarbon solvent (boiling range of 145–195° C.) | 1880 |

Allow temperature to go to 170° F. Hold for 2–3 hours, then heat to 280–290° F. and hold for Gardner viscosity of Z at 60% solids.

The resulting polyurethane resin has the following final characteristics:

| Solids (percent) | 60.1 |
|---|---|
| Viscosity (Gardner) | Z |

EXAMPLE II

An interpolymer is prepared containing 40% of the unsaturated polyurethane resin of Example I, 10% acrylamide, 30% styrene and 20% ethyl acrylate, as indicated below:

| Charge composition: | Parts by weight |
|---|---|
| n-Butyl alcohol | 100 |
| Paraformaldehyde (91%) | 80 |
| Aromatic hydrocarbon solvent (boiling range of 145–195° C.) | 100 |
| Acrylamide | 100 |
| n-Butyl alcohol | 100 |
| 2-butoxy ethanol | 220 |
| Unsaturated polyurethane of Example I (60% solids) | 670 |
| Ethyl acrylate | 200 |
| Styrene | 300 |
| Azobisbutyronitrile | 6 |
| Di-tertiary-butyl peroxide | 6 |
| Triethyl amine | 3 |
| Benzoyl peroxide | 2 |
| Tertiary dodecyl mercaptan | 7 |
| Cumene-hydro peroxide | 3 |

*Procedure for polymerization.*—Charge into a reactor equipped with an agitator, thermometer, nitrogen inlet tube and reflux condenser, 100 parts of n-butyl alcohol, 80 parts of paraformaldehyde and 100 parts of aromatic hydrocarbon solvent. Dissolve in a separate container 100 parts of acrylamide in 100 parts of n-butyl alcohol and 220 parts of 2-butoxy ethanol and add the other monomers and catalysts. Add the above acrylamide-monomer solution from a separatory funnel to the reactor over a period of 2½ hours while maintaining the temperature at 240–250° F. After four hours add 3 parts of cumenehydro peroxide. Hold for an additional 6 to 8 hours at 240–250° F. until monomer conversion is completed.

The final characteristics of the interpolymer are:

| Solids (percent) | 49.5 |
|---|---|
| Viscosity (Gardner) | Z |
| Color (Gardner) | 3 |

EXAMPLE III

Another oil-modified unsaturated polyurethane is prepared as follows, using a larger excess of hydroxyl with respect to isocyanate:

| | Parts by weight |
|---|---|
| Safflower oil | 1635 |
| Glycerine | 235 |
| Polypropylene glycol ether (molecular weight 1025) | 175 |
| Calcium naphthenate drier | 5 |

Charge the above ingredients to a reactor equipped with an agitator, thermometer and nitrogen inlet tube and heat to 480° F. Hold for one hour, then cool to 100° F. and add:

| Trimethylol propane mono-allyl ether | 160 |
|---|---|

Premix in separate container and add over 1 hour period:

| Toluene diisocyanate | 690 |
|---|---|
| Aromatic hydrocarbon solvent (boiling range of 145–195° C.) | 940 |

Allow temperature to go to 165–175° F. Hold for 4 hours and then heat to 250° F. Hold for one hour and then add:

| n-Butyl alcohol | 100 |
|---|---|

Cool to room temperature.

The resulting polyurethane resin has the following final characteristics:

| Solids (percent) | 60.5 |
|---|---|
| Viscosity (Gardner) | $Z_3$ |
| Color (Gardner) | 6 |

Example IV

Another interpolymer is prepared containing 40% of the unsaturated polyurethane resin of Example III, 10% Acrylamide and 50% styrene, as indicated below:

| Charge composition: | Parts by weight |
|---|---|
| n-butyl alcohol | 230 |
| 40% formaldehyde solution in butanol | 195 |
| Unsaturated polyurethane of Example III (60% solids) | 667 |
| Acrylamide | 100 |
| 2-butoxy ethanol | 215 |
| Styrene | 500 |
| Aromatic hydrocarbon solvent (boiling range of 145–195° C.) | 100 |
| Azobisbutyronitrile | 6 |
| Tertiary dodecyl mercaptan | 5 |
| Benzoyl peroxide | 2 |
| Di-tertiary butyl peroxide | 6 |
| Cumene hydro peroxide | 5 |
| Triethyl amine | 3 |

*Procedure for polymerization.*—Charge into a reactor equipped with an agitator, thermometer, nitrogen inlet tube, reflux condenser and Dean-Stark trap, 100 parts of n-butyl alcohol, 667 parts of unsaturated polyurethane resin (60% solids in aromatic hydrocarbon solvent) and 45 parts of 40% formaldehyde solution in butanol.

Dissolve in a separate container, 100 parts of acrylamide in 130 parts of n-butyl alcohol, 215 parts of 2-butoxy ethanol and 150 parts of 40% formaldehyde solution in butanol. To this solution add the remaining monomers and catalysts. Add this monomer solution to the reactor over a 2½ hour period while maintaining the temperature at 250–260° F., while azeotropically distilling off water of etherification. Distill off 18 parts of water and remove the Dean-Stark trap. Add 3 parts of cumene hydro peroxide after 4 hours. Hold at reflux temperature for 8–10 hours until the conversion of monomers is complete.

The final charcteristics of the interpolymer are:

| Solids (percent) | 49.6 |
|---|---|
| Viscosity (Gardner) | X |
| Color (Gardner) | 4–5 |

Example V

An oil free unsaturated polyether-polyurethane resin is prepared in two stages as follows:

An adduct of toluene diisocyanate with diols is prepared in the first stage at a mol ratio of isocyanate/hydroxyl of about 2:1 and contains free isocyanate groups. In the second stage, two molar proportions of a triol or polyether triol are added to one molar proportion of the adduct in order to form an hydroxy-terminated unsaturated polyurethane with free hydroxyl groups.

| Charge composition: | Parts by weight |
|---|---|
| Polypropylene glycol polyether (molecular weght 1025) | 1330 |
| Trimethylol propane monoallyl ether | 122 |
| Toluene diisocyanate | 696 |
| Hexantriol | 536 |

*Procedure for preparation—Stage one.*—Charge into a reactor equipped with an agitator, thermometer, nitrogen inlet tube, and a condenser, 696 parts of toluene diisocyanate and then gradually add the blend of trimethylol propane monoallyl ether and polypropylene glycol ether over a one hour period while maintaining the temperature below 140–145° F. The reactants are maintained at this temperature for two hours. The following solvent combination is then added: 270 parts of xylol and 270 parts of 2-ethoxy ethanol acetate to reduce the viscosity of the isocyanate-terminated adduct.

*Procedure for preparation—Stage two.*—To the above prepared adduct add the 536 parts of hexantriol at 140°

F. and then increase the temperature to 270° F. and hold for 3–4 hours.

The final charcteristics of the polyurethane resin are:

| | |
|---|---|
| Solids (percent) | 55.1 |
| Viscosity (Gardner) | Z–Z |
| Color (Gardner) | 5 |

*Example VI*

An interpolymer is prepared containing the oil free unsaturated polyether-polyurethane resin of Example V as indicated below:

| Charge composition: | Parts by weight |
|---|---|
| Aromatic hydrocarbon solvent (boiling range 145–195° C.) | 300 |
| n-butanol | 85 |
| Paraformaldehyde (91%) | 80 |
| 2-ethoxy ethanol | 65 |
| Acrylamide | 100 |
| n-butanol | 210 |
| 2-ethoxy ethanol | 120 |
| Styrene | 250 |
| Methyl methacrylate | 50 |
| Ethyl acrylate | 350 |
| Unsaturated polyurethane of Example V | 200 |
| 2-ethylhexyl acrylate | 100 |
| Azobisbutyronitrile | 6 |
| Di-tertiary-butyl peroxide | 6 |
| Tertiary dodecyl mercaptan | 19 |
| Cumene hydro-peroxide | 5 |
| Triethyl amine | 3 |

*Procedure for polymerization.*—charge into a reactor equipped with an agitator, thermometer, nitrogen inlet tube and reflux condenser 300 parts of aromatic hydrocarbon solvent, 85 parts of n-butanol, 80 parts of paraformaldehyde and 65 parts of 2-ethoxy ethanol. In a separate container, dissolve 100 parts of acrylamide in 210 parts of n-butanol and 120 parts of 2-ethoxy ethanol and add the other monomers and catalysts. Add the above acrylamide-monomer solution from the separatory funnel to the reactor over a 2½ hour period while maintaining the temperature at 240–250° F. After four hours, add 5 parts of cumene hydro-peroxide. Hold for an additional 6 to 8 hours at 240–250° F. until monomer conversion is complete.

The final characteristics of the interpolymer are:

| | |
|---|---|
| Solids (percent) | 53 |
| Viscosity (Gardner) | X |
| Color (Gardner) | 1–2 |

EXAMPLE VII

The acrylamide-polyurethane interpolymer of Example VI is evaluated as a gloss coil coating enamel and as a flat coil coating enamel.

*Gloss coil coating.*—The composition of the gloss enamel consists of 28% titanium dioxide and 32% non-volatile resin of Example VI.

Films of the enamel are applied on phosphate-treated aluminum coil using a #38 wire wound rod and baked for 90 seconds in a gas fired oven at 475° F.

The cured coating has the following properties:

| | |
|---|---|
| Gloss (60°) | 91 |
| Pencil hardness | HB |
| Reverse impact, inch/pounds | Pass 65 |
| 60 seconds toluol resistance | Insoluble |
| Adhesion to metal | Excellent |
| 2 T bend [1] | Very good |
| Chill bump (reverse impact at 40° F.), inch/pounds | Pass 65 |

[1] The designation "2 T" identifies a bend having a diameter twice the thickness of the metal.

*Flat coil coating.*—The formulation of the flat enamel is:

| | Percent |
|---|---|
| Pigment | 38.2 |
| Finely divided silica flatting agent | 15.7 |
| Titanium dioxide | 84.3 |
| Non-volatile resin of Example VI | 24.8 |

Films of the flat coil coating enamel are applied on phosphate-treated aluminum coil using a #35 wire wound rod and baked for 1½ minutes in a gas fired oven at 475° F.

The cured coating has the following properties:

| | |
|---|---|
| Gloss (60°) | 14 |
| Pencil hardness | HB |
| Reverse impact, inch/pounds | Pass 30 |
| 60 seconds toluol resistance | Insoluble |
| Adhesion to metal | Very good |
| 2 T bend | Good |

As the above results indicate, the coating prepared utilizing the polyurethane-modified resins in accordance with the invention have outstanding flexibility and impact properties and possess excellent solvent resistance.

EXAMPLE VIII

The present example illustrates a preferred method of interpolymer production in accordance with the invention, using paraformaldehyde and alkoxy alkanol without removal of water to minimize etherification.

Using the same procedure as in Example VI, the interpolymer is prepared consisting of:

| | Percent |
|---|---|
| Unsaturated polyurethane resin of Example III | 20 |
| Acrylamide | 10 |
| Styrene | 25 |
| Methyl methacrylate | 5 |
| 2-ethylhexyl acrylate | 30 |
| Butyl acrylate | 10 |

| Charge Composition: | Parts by weight |
|---|---|
| Aromatic hydrocarbon solvent (boiling range of 145–195° C.) | 200 |
| 2-ethoxy ethanol | 200 |
| Paraformaldehyde | 80 |
| Acrylamide | 100 |
| 2-ethoxy ethanol | 370 |
| 2-ethylhexyl acrylate | 100 |
| Styrene | 250 |
| Methyl methacrylate | 50 |
| Ethyl acrylate | 300 |
| Unsaturated polyurethane resin of Example III | 330 |
| Di-tertiary butyl peroxide | 6 |
| Tertiary dodecyl mercaptan | 20 |
| Azobisbutyronitrile | 6 |
| Cumene hydro-peroxide | 5 |
| Triethyl amine | 3 |

The final characteristics of the interpolymer are:

| | |
|---|---|
| Solids (percent) | 53.1 |
| Viscosity (Gardner) | Z |
| Color (Gardner) | 3 |

EXAMPLE IX

A further interpolymer is prepared utilizing the unsaturated polyurethane resin of Example III and evaluated in high gloss and flat aluminum coil coating finishes.

| Charge Composition: | Parts by weight |
|---|---|
| Aromatic hydrocarbon solvent (boiling range of 145–195° C.) | 240 |
| n-Butyl alcohol | 230 |
| 40% formaldehyde solution in butanol | 200 |
| Acrylamide | 100 |
| 2-butoxy ethanol | 220 |
| 2-ethylhexyl acrylate | 100 |
| Styrene | 200 |

| Charge Composition: | Parts by weight |
|---|---|
| Methyl methacrylate | 60 |
| Unsaturated polyurethane resin of Example III | 170 |
| Ethyl acrylate | 440 |
| Azobisbutyronitrile | 6 |
| Di-tertiary-butyl peroxide | 6 |
| Tertiary dodecyl mercaptan | 16 |
| Cumene hydro-peroxide | 5 |
| Triethyl amine | 3 |

*Procedure for polymerization.*—Charge into a reactor equipped with an agitator, thermometer, nitrogen inlet tube, reflux condenser and Dean-Stark trap, 240 parts of aromatic hydrocarbon solvent, 100 parts of n-butanol and 50 parts of 40% formaldehyde solution in n-butanol and heat to 250° F. Set Dean-Stark trap with n-butanol. In a separate container dissolve 100 parts of acrylamide in 130 parts of n-butanol, 220 parts of 2-butoxy ethanol and 150 parts of 40% formaldehyde solution in n-butanol. To this solution add the remaining monomers and catalysts. This monomer solution is added to the reactor over a 2½ hour period at 250–260° F., while azeotropically distilling off the water of etherification. After 15 parts of water are distilled off, the Dean-Stark trap is removed. After 4 hours, add 5 parts of cumene hydro-peroxide. Hold for an additional 6 to 8 hours at 240–250° F. until monomer conversion is complete.

The final characteristics of the interpolymer are:

| | |
|---|---|
| Solids (percent) | 52.0 |
| Viscosity (Gardner) | W |
| Color (Gardner) | 2–3 |

EXAMPLE X

*Evaluation of interpolymer of Example IX in gloss coil coating*

The composition of the gloss enamel consists of 28% titanium dioxide and 32% non-volatile resin of Example IX.

Films of the enamel are applied on phosphate-treated aluminum coil using a #38 wire wound rod and cured by baking for 90 seconds at 475° F.

The coating has the following properties:

| | |
|---|---|
| Gloss (60°) | 82 |
| Pencil hardness | HB |
| Reverse impact, inch/pounds | Pass 70 |
| 60 seconds toluol resistance | Insoluble |
| Adhesion | Very good |
| 2 T bend (note 1, Ex. VII) | Good |
| Chill bump, inch/pounds | Pass 70 |

*Evaluation of interpolymer of Example IX in flat coil coating*

The composition of the flat enamel is:

| | Percent |
|---|---|
| Pigment | 38 |
| Titanium dioxide | 74 |
| Talc | 17 |
| Finely divided silica flatting agent | 9 |
| Non-volatile resin of Example IX | 25 |

Drawdowns of the enamel are made on aluminum panels using a #38 wire wound rod and cured in a gas fired oven for 90 seconds at 470° F.

The coating has the following properties:

| | |
|---|---|
| Gloss (60°) | 15 |
| Pencil hardness | H |
| Reverse impact, inch/pounds | Pass 20 |
| 60 seconds toluol resistance | Insoluble |
| Adhesion to metal | Very good |
| 2 T bend (note 1, Ex. VII) | Good |

As the above results illustrate, the coatings prepared utilizing the polyurethane modified resins of the invention have extremely good flexibility and impact properties and possess excellent solvent resistance.

EXAMPLE XI

Examples VII and X are repeated replacing 25% of the resin solids used in these Examples with a corresponding weight of the following resin solutions:

(1) A benzoguanamine-formaldehyde resin which is a condensation product of 4 mols of formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.

(2) A butylated melamine-formaldehyde resin which is a condensation product of 5.5 mols of formaldehyde with 1 mol of melamine in the presence of excess butanol and formic acid catalyst to provide a solvent-soluble heat-hardening resin. The melamine-formaldehyde resin is used in the form of a 50% solids solution in 40/10 butanol/xylol solvent mixture which exhibits the following physical characteristics:

| | |
|---|---|
| Viscosity | 320 centipoises. |
| Mineral spirits tolerance | 9.5/1 (95 cc./10 grams). |
| Acid number | Less than 1.0. |

(3) A butylated urea-formaldehyde resin which is a condensation product of 2.2 mols of formaldehyde with 1 mol of urea in the presence of excess butanol and oxalic acid catalyst to provide a solvent-soluble heat-hardening resin. The urea-formaldehyde resin is used in the form of a 54% solids solution in 40/10 butanol/xylol solvent mixture which exhibits the following physical characteristics:

| | |
|---|---|
| Viscosity | 460 centipoises. |
| Mineral spirits tolerance | 25 cc./10 grams resin. |

(4) Methyl ether of hexamethylol melamine.

(5) A vinyl chloride-vinyl acetate copolymer containing 91% vinyl chloride, 3% vinyl acetate and 6% vinyl alcohol and having an intrinsic viscosity in 1% cyclohexanone at 30° C. of 0.57.

In each instance, an improved cure is noted by the achievement of insoluble films having increased hardness.

The invention is defined in the claims which follow.

I claim:

1. A solvent-soluble, heat-hardening, non-gelled interpolymer comprising: (A) an amide of an ethylenically unsaturated carboxylic acid; and (B) resinous hydroxy-terminated polyethylenically unsaturated polyurethane; said interpolymer having amido hydrogen atoms replaced by the structure:

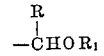

in which R is selected from the group consisting of hydrogen, furyl, and aromatic and saturated lower aliphatic hydrocarbon radicals containing up to 10 carbon atoms, and $R_1$ is selected from the group consisting of hydrogen and the etherification residue of aliphatic alcohol containing up to 10 carbon atoms.

2. An interpolymer as recited in claim 1 in which R is hydrogen and at least 25% of $R_1$ is hydrogen.

3. An interpolymer as recited in claim 1 in which said amide is an acrylamide.

4. A solvent-soluble, heat-hardening, non-gelled interpolymer comprising: (A) an acrylamide in an amount of from 2–50% by weight, based on the weight of the interpolymer; and (B) the balance of the interpolymer comprising resinous hydroxy-terminated polyethylenically unsaturated polyurethane; said interpolymer being reacted with from 0.2–5 equivalents of aldehyde per amide group in said interpolymer.

5. An interpolymer as recited in claim 4 in which formaldehyde is reacted with acrylamide.

6. An interpolymer as recited in claim 4 in which said interpolymer is etherified with alcohol to an extent of up

13 to 50% of the hydroxy groups generated by reaction with said aldehyde.

7. An interpolymer as recited in claim 4 in which said unsaturated polyurethane is the reaction product of components comprising organic diisocyanate and hydroxy components comprising ethylenically unsaturated compound containing the hydroxy group, saturated aliphatic diol, and saturated aliphatic polyhydroxy compound containing at least 3 hydroxyl groups.

8. An interpolymer as recited in claim 7 in which said diisocyanate is present in an amount of from 10–30% by weight, based on the weight of said polyurethane.

9. An interpolymer as recited in claim 7 in which said hydroxy components include at least 10% by weight, based on the total weight of hydroxy components, of polyether having a molecular weight of from 300 to about 7000.

10. An interpolymer as recited in claim 7 in which the stoichiometric balance of hydroxy group to isocyanate group in said polyurethane is within the range of from 1.05:1 to 2.5:1.

11. An interpolymer as recited in claim 7 in which the components interpolymerized to provide said interpolymer include monomer containing the $CH_2$=$C<$ group.

12. A solvent-soluble, heat-hardening, non-gelled interpolymer of:
(A) an acrylamide in an amount of from 2–50% by weight, based on the weight of the interpolymer;
(B) monomer containing the $CH_2$=$C<$ group; and
(C) resinous hydroxy-terminated polyethylenically unsaturated polyurethane comprising:
(1) organic diisocyanate in an amount of from 5–30% by weight, based on the weight of said polyurethane; and
(2) hydroxy components comprising ethylenically unsaturated compound containing the hydroxy group, saturated aliphatic diol, and saturated aliphatic polyhydroxy compound containing at least 3 hydroxyl groups;
said polyurethane having a stoichiometric balance of hydroxy group to isocyanate group within the range of from 1.05:1 to 2.5:1, and said polyurethane having an unsaturation indicated by an iodine number of from 25 to 400; said interpolymer having amido hydrogen atoms reacted with formaldehyde to generate methylol groups.

13. An interpolymer as recited in claim 12 in which said unsaturated compound containing the hydroxy group is a monoallyl ether of a trihydric organic compound.

14. An interpolymer as recited in claim 12 in which said hydroxy components include at least 10% by weight, based on the total weight of hydroxy components, of polyether having a molecular weight of from 300 to about 7000.

15. An interpolymer as recited in claim 12 in which said polyurethane has a Gardner-Holdt Viscosity measured in n-butanol at 80% solids at 25° C. of from C to Z–6, and has a hydroxyl functionality indicated by a hydroxyl number of from 10–300.

16. An interpolymer as recited in claim 12 in which said polyurethane includes triglyceride oil reacted therein, the fatty acid groups of said oil being distributed to the various hydroxy components of said polyurethane by an alcoholysis reaction.

17. A solvent-soluble, heat-hardening, non-gelled interpolymer of:
(A) acrylamide in an amount of from 2–30% by weight, based on the weight of the interpolymer;
(B) monomer containing the $CH_2$=$C<$ group; and
(C) from 5–80% by weight, based on the weight of the interpolymer of resinous hydroxy-terminated polyethylenically unsaturated polyurethane comprising:
(1) organic diisocyanate in an amount of from 10–30% by weight, based on the weight of said polyurethane; and
(2) hydroxy components comprising monoethylenically unsaturated aliphatic dihydroxy compound, saturated aliphatic diol, and saturated aliphatic polyhydroxy compound containing at least 3 hydroxyl groups, at least 10% by weight, based on the total weight of hydroxy component, of polyoxyalkylene glycol having a molecular weight from 400 to 5000; said polyurethane having a stoichiometric balance of hydroxy group to isocyanate group within the range of from 1.1:1 to 2.0:1, and said polyurethane having an unsaturation indicated by an iodine number of from 50 to 300; said interpolymer having amido hydrogen atoms reacted with formaldehyde to generate methylol groups.

18. An organic solvent solution comprising an organic solvent having dissolved therein the interpolymer of claim 1.

19. An organic solvent solution as recited in claim 18 in which said organic solvent further contains from 5 to 95% by weight, based on the total weight of resin, of hydroxy-functional solvent-soluble resinous material.

20. An organic solvent solution as recited in claim 19 in which said resinous material is heated-hardening aminoplast resins.

21. An organic solvent solution as recited in claim 19 in which said resinous material is a copolymer of from 80–92% by weight of vinyl chloride, vinyl alcohol in an amount of from 2–10% by weight and the balance of the copolymer consisting essentially of vinyl acetate.

22. A method of producing resinous hydroxyterminated polyethylenically unsaturated polyurethane adapted to form solvent-soluble, heat-hardening, non-gelled interpolymer with amides of ethylenically unsaturated carboxylic acid comprising reacting hydroxy components comprising ethylenically unsaturated hydroxy compound and saturated aliphatic diol with a large stoichiometric excess of organic polyisocyanate to form an isocyanate-terminated intermediate, and reacting said intermediate with a stoichiometric excess of a polyhydric alcohol containing at least 3 hydroxy groups to form said hydroxy-terminated product.

23. A method of producing oil-modified resinous hydroxy-terminated polyethylenically unsaturated polyurethane adapted to form solvent-soluble, heat-hardening, non-gelled interpolymer with amides of ethylenically unsaturated carboxylic acid comprising mixing triglyceride oil with hydroxy components comprising diol and polyhydric alcohol containing at least 3 hydroxy groups, subjecting said mixture to alcoholysis to distribute the fatty acid groups of said oil to the various hydroxy components of said mixture, and reacting said mixture including ethylenically unsaturated hydroxy compound with organic polyisocyanate in an at least 5% stoichiometric deficiency of isocyanate group to form said hydroxy-terminated product, said polyisocyanate being used in an amount of at least 5% by weight, based on the weight of the polyurethane.

24. A solvent-soluble, non-gelled interpolymer comprising resinous hydroxy-terminated polyethylenically unsaturated polyurethane and monomer containing the $CH_2$=$C<$ group interpolymerized therewith.

25. An interpolymer as recited in claim 24 in which said unsaturated polyurethane is the reaction product of components comprising organic diisocyanate and hydroxy components comprising ethylenically unsaturated compound containing the hydroxy group, saturated aliphatic diol, and saturated aliphatic polyhydroxy compound containing at least 3 hydroxyl groups, said diiosocyanate being present in an amount of from 10–30% by weight, based on the weight of said polyurethane.

26. An interpolymer as recited in claim 25 in which said hydroxy components include at least 10% by weight, based on the total weight of hydroxy components, of polyether having a molecular weight of from 300 to about 7000, and the stoichiometric balance of hydroxy group to isocyanate group in said polyurethane is within the range of from 1.05:1 to 2.5:1.

References Cited

UNITED STATES PATENTS

| | | | |
|---|---|---|---|
| 2,769,826 | 11/1956 | Yoho | 260—77.5 |
| 2,812,337 | 11/1957 | Culemeyer | 260—77.5 |
| 2,833,730 | 5/1958 | Barthel | 260—77.5 |
| 2,906,945 | 6/1960 | Sekmakas | 260—849 |
| 2,936,293 | 5/1960 | Orth | 260—77.5 |
| 2,940,945 | 6/1960 | Christenson et al. | 260—21 |
| 2,995,531 | 8/1961 | Hudson | 260—21 |
| 3,001,958 | 9/1961 | Schwarcman | 260—77.5 |
| 3,075,926 | 1/1963 | Stewart et al. | 260—77.5 |
| 3,114,735 | 12/1963 | Pigott | 260—77.5 |
| 3,118,853 | 1/1964 | Hart et al. | 260—897 |
| 3,129,200 | 4/1964 | Müller et al. | 260—77.5 |
| 3,143,517 | 8/1964 | Heiss | 260—77.5 |
| 3,163,615 | 12/1964 | Sekmakas | 260—21 |
| 3,178,394 | 4/1965 | Christenson | 260—21 |
| 2,906,717 | 9/1959 | Sekmakas | 260—849 |

DONALD E. CZAJA, *Primary Examiner.*

LEON J. BERCOVITZ, *Examiner.*

R. W. GRIFFIN, *Assistant Examiner.*